United States Patent
Yancey

(10) Patent No.: US 11,041,235 B2
(45) Date of Patent: Jun. 22, 2021

(54) METHOD AND DEVICE FOR PROMOTING ADHESION OF METALLIC SURFACES

(71) Applicant: Atmospheric Plasma Solutions, Inc., Cary, NC (US)

(72) Inventor: Peter Joseph Yancey, Cary, NC (US)

(73) Assignee: Atmospheric Plasma Solutions, Inc., Cary, NC (US)

( * ) Notice: Subject to any disclaimer, the term of this patent is extended or adjusted under 35 U.S.C. 154(b) by 154 days.

(21) Appl. No.: 15/776,692

(22) PCT Filed: Nov. 22, 2016

(86) PCT No.: PCT/US2016/063392
§ 371 (c)(1),
(2) Date: May 16, 2018

(87) PCT Pub. No.: WO2017/087991
PCT Pub. Date: May 26, 2017

(65) Prior Publication Data
US 2018/0363124 A1    Dec. 20, 2018

Related U.S. Application Data

(63) Continuation of application No. 62/258,522, filed on Nov. 22, 2015.

(51) Int. Cl.
*C23C 8/36* (2006.01)
*H05H 1/24* (2006.01)
(Continued)

(52) U.S. Cl.
CPC .................. *C23C 8/36* (2013.01); *B32B 7/12* (2013.01); *B32B 15/04* (2013.01); *B32B 37/12* (2013.01);
(Continued)

(58) Field of Classification Search
CPC .......... H05H 1/2406; H05H 2001/2412; C23C 8/36; C23C 8/12; C23C 8/14; B32B 2255/06; C32C 8/36; C32C 8/38
See application file for complete search history.

(56) References Cited

U.S. PATENT DOCUMENTS 5,313,931 A    5/1994 Coulcher et al.
5,414,324 A    5/1995 Roth et al.
(Continued)

FOREIGN PATENT DOCUMENTS

EP    0282310 A2    9/1988
GB    1125806 A    9/1968
(Continued)

OTHER PUBLICATIONS

Brunelli, K., et al. 2012. "The effect of surface treatment with atmospheric pressure plasma jet, generated by air, on corrosion properties of AISI 304L stainless steel." Materials Chemistry and Physics, vol. 136, 1073-1080.
(Continued)

*Primary Examiner* — Scott W Dodds
(74) *Attorney, Agent, or Firm* — Olive Law Group, PLLC

(57) ABSTRACT

An adhesion promoting layer is formed on a metallic substrate by generating a non-thermal plasma in air at atmospheric pressure, and exposing a surface of the metallic substrate to the plasma. The plasma oxidizes the metallic substrate to form metal oxide from metal atoms of the metallic substrate. The metal oxide is formed as a metal oxide layer disposed directly on an underlying bulk metallic layer of the metallic substrate. Alternatively, the plasma nitridizes the metallic substrate to form metal nitride from metal atoms of the metallic substrate. The metal nitride is formed as a metal nitride layer disposed directly on an underlying bulk metallic layer of the metallic substrate.

16 Claims, 7 Drawing Sheets

(51) Int. Cl.
  *B32B 7/12*    (2006.01)
  *B32B 15/04*   (2006.01)
  *B32B 37/12*   (2006.01)
  *C23C 8/12*    (2006.01)
  *C23C 8/24*    (2006.01)

(52) U.S. Cl.
  CPC ............. *C23C 8/12* (2013.01); *C23C 8/24* (2013.01); *H05H 1/2406* (2013.01); *B32B 2255/06* (2013.01); *B32B 2255/20* (2013.01)

(56) References Cited

U.S. PATENT DOCUMENTS

| | | | |
|---|---|---|---|
| 5,913,144 | A | 6/1999 | Nguyen et al. |
| 5,922,412 | A | 7/1999 | Baughman et al. |
| 5,928,527 | A | 7/1999 | Li et al. |
| 5,961,772 | A | 10/1999 | Selwyn |
| 5,970,993 | A | 10/1999 | Witherspoon et al. |
| 5,976,992 | A | 11/1999 | Ui et al. |
| 6,262,523 | B1 | 7/2001 | Selwyn et al. |
| RE37,853 | E | 9/2002 | Detering et al. |
| 6,967,304 | B2 | 11/2005 | Gevelber et al. |
| 7,964,822 | B2 | 6/2011 | Suen |
| 8,658,258 | B2 | 2/2014 | Hanson |
| 8,981,251 | B2 | 3/2015 | Yancey et al. |
| 9,406,485 | B1 * | 8/2016 | Cheng et al. ........... H01J 37/32 |
| 2002/0166682 | A1 | 11/2002 | Watchko et al. |
| 2003/0165636 | A1 * | 9/2003 | Koulik et al. ......... H01J 37/32 427/569 |
| 2005/0081920 | A1 | 4/2005 | Rimondo et al. |
| 2006/0000488 | A1 | 1/2006 | Claar et al. |
| 2006/0052883 | A1 | 3/2006 | Lee et al. |
| 2006/0096707 | A1 | 5/2006 | Selwyn et al. |
| 2006/0156983 | A1 | 7/2006 | Penelon et al. |
| 2006/0198944 | A1 | 9/2006 | Gevelber et al. |
| 2007/0014752 | A1 | 1/2007 | Roy et al. |
| 2007/0029500 | A1 | 2/2007 | Coulombe et al. |
| 2007/0190801 | A1 * | 8/2007 | Fujinnura et al. ...... H01L 21/31 |
| 2007/0231590 | A1 | 10/2007 | Blum |
| 2009/0142514 | A1 | 6/2009 | O'Neill et al. |
| 2009/0188626 | A1 | 7/2009 | Lu et al. |
| 2010/0237043 | A1 | 9/2010 | Garlough |
| 2014/0061157 | A1 | 3/2014 | Yancey et al. |
| 2016/0339545 | A1 | 11/2016 | Sordelet et al. |

FOREIGN PATENT DOCUMENTS

| | | |
|---|---|---|
| JP | 2003027210 A | 1/2003 |
| WO | 9936955 A1 | 7/1999 |
| WO | 2004053185 A1 | 6/2004 |

OTHER PUBLICATIONS

Extended European Search Report issued in counterpart EP Application No. 16867366.3 dated Jun. 19, 2019 (thirteen (13) pages).
Kim, Hyun-Su, et al. 2010. "Metal Surface oxidation by using dielectric barrier discharge." Thin Solid Films, vol. 518, 6394-6398.
Prysiazhnyi, V. and M. Cernak. 2012. "Air plasma treatment of copper sheets using Diffuse Coplanar Surface Barrier Discharge." Thin Solid Films, vol. 520, 6561-6565.
Tang, Shen et al. 2006. "Enhancement of adhesion strength between two AISI 316 L stainless steel plates through atmospheric pressure plasma treatment." Surface & Coatings Technology, vol. 200, 5220-5228.
Wang, Changquan and Xiangning He. 2006. "Effect of atmospheric pressure dielectric barrier discharge air plasma on electrode surface." Applied Surface Science, vol. 253, 926-929.
EP Notice of Allowance issued in counterpart EP Application No. 10739236.7 dated Dec. 14, 2017 (thirty-five (35) pages).
Kim, J.K., et al., "Adhesion characteristics of carbon/epoxy composites treated with low- and atmospheric pressure plasmas," J. Adhesion Sci. Technol. 17(13), 1751-71 (2003).
International Search Report and Written Opinion issued in counterpart PCT Application No. PCT/US2016/063392, dated Mar. 7, 2017 (eighteen (18) pages).
Restriction Requirement issued in counterpart U.S. Appl. No. 12/702,039 dated Jun. 8, 2012 (six (6) pages).
Non-Final Office Action issued in counterpart U.S. Appl. No. 12/702,039 dated Aug. 23, 2012 (seven (7) pages).
Final Office Action issued in counterpart U.S. Appl. No. 12/702,039 dated Apr. 10, 2013 (seven (7) pages).
Advisory Action issued in counterpart U.S. Appl. No. 12/702,039 dated Jul. 24, 2013 (three (3) pages).
Non-Final Office Action issued in counterpart U.S. Appl. No. 12/702,039 dated Sep. 11, 2014 (seven (7) pages).
Final Office Action issued in counterpart U.S. Appl. No. 12/702,039 dated May 21, 2015 (eleven (11) pages).
Non-Final Office Action issued in counterpart U.S. Appl. No. 12/702,039 dated Jul. 1, 2016 (seven (7) pages).
Final Office Action issued in counterpart U.S. Appl. No. 12/702,039 dated Mar. 29, 2017 (nine (9) pages).
Restriction Requirement issued in counterpart U.S. Appl. No. 12/702,110 dated Apr. 24, 2012 (six (6) pages).
Non-Final Office Action issued in counterpart U.S. Appl. No. 12/702,110 dated Jul. 5, 2012 (six (6) pages).
Non-Final Office Action issued in counterpart U.S. Appl. No. 12/702,110 dated Jan. 17, 2013 (eight (8) pages).
International Preliminary Report on Patentability issued in counterpart PCT Application No. PCT/US2016/063392 dated May 22, 2018 (fifteen (15) pages).
Communication pursuant to Article 94(3) EPC from European Patent Office regarding reiated application 16867366.3-1211 dated Jul. 28, 2020 (8 pages).
Kuromoto, N., et al. "Titanium oxide films produced on commercially pure titanium by anodic oxidation with different voltages," Materials Characterization, 2007, 114-121, 58, Elsevier, Amsterdam, The Netherlands.
Restriction requirement from USPTO regarding related application 16124754 dated Nov. 8, 2019 (eleven (11) pages).
Non-Final Office Action from USPTO regarding related Application 16124754 dated Oct. 16, 2020 (sixteen (16) pages).

\* cited by examiner

METHOD AND DEVICE FOR PROMOTING ADHESION OF METALLIC SURFACES

RELATED APPLICATIONS

This application is the national stage under 35 U.S.C. 371 of International Application No. PCT/US2016/063392, filed Nov. 22, 2016, which claims the benefit of U.S. Provisional Patent Application Ser. No. 62/258,522, filed Nov. 22, 2015, the contents of each of which are incorporated herein by reference in their entireties.

TECHNICAL FIELD

The present invention generally relates to promoting adhesion of metallic surfaces, particularly with the use of atmospheric pressure plasma. In particular, the invention relates to forming a metal oxide layer or metal nitride layer from metal of an underlying metallic substrate.

BACKGROUND

The fabrication of various products often requires attaching one component to another component to fix the positions of the components relative to each other. The attachment may be implemented by mechanical techniques (e.g., utilizing threaded fasteners, clamping fasteners, press-fitted components, etc.) or bonding techniques (e.g., utilizing adhesives, welding, etc.). Techniques utilizing structural adhesive bonding offer many advantages over techniques utilizing mechanical fasteners, and as a result have made significant gains in replacing mechanical fasteners over the past few decades. Properly formed adhesive bonds offer improved structural integrity in addition to weight and cost savings. However, transitioning to adhesive bonding brings a new set of engineering challenges to ensure that bonds are made properly to avoid unexpected bond failure. Due to the nature of the adhesive bond, surface preparation is paramount. In many cases, fully adequate surface treatment technologies either do not exist or have significant disadvantages, such as the use of hazardous materials, materials with a limited shelf-life, the process requires many complicated steps, contamination from debris, and long treatment times. A technology that addresses these issues could significantly alter the landscape and enable wider adoption and access to the superior properties of structural adhesive bonding.

Certain materials that are desired for use in fabricating products have traditionally been difficult to bond by structural adhesive bonding. As one example, titanium-based alloys offer many advantages over other material systems, including high strength-to-weight ratios and high performance at elevated temperatures. However, the highly passive nature of titanium and difficultly of chemical processing have thus far hindered the use of titanium with structural adhesive bonding. Due to the great potential for adhesively bonded titanium in aerospace and other engineering applications, many techniques have been employed to address these issues, including various cleaning techniques, grit blasting, and sol-gel coatings to improve binding of a primer to the titanium surface. An ongoing need, however, remains for improved and new techniques that reduce cost and eliminate the complex, multi-step surface preparation processes that are currently being used.

Atmospheric pressure (AP) plasma has been utilized to remove a coating of material (e.g., a layer, film, paint, etc.) from the surface of a substrate. The source of the AP plasma may be device configured to discharge an AP plasma plume from a nozzle. The device may positioned at some specified distance between the nozzle and the surface of the coating, and oriented so as to direct the AP plasma plume toward the coating. While the AP plasma plume is active, the device may be moved across the coating along an appropriate path to effect removal of the coating or a desired portion thereof. See, e.g., U.S. Pat. Nos. 8,133,324; 8,604,379; and U.S. Patent App. Pub. No. 2010/0200016; the contents of each of which are incorporated by reference herein in their entireties. To date, however, the potential for the use of AP plasma as a modality for promoting adhesive bonding of metallic surfaces has not been adequately appreciated or investigated.

In view of the foregoing, there is an ongoing need for methods and devices for promoting adhesion of metallic surfaces.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, a method for forming an adhesion promoting layer on a metallic substrate includes: generating a non-thermal plasma in air at atmospheric pressure, the non-thermal plasma comprising monatomic oxygen; and exposing a substrate surface of the metallic substrate to the non-thermal plasma, wherein: the non-thermal plasma oxidizes the metallic substrate to form metal oxide from metal atoms of the metallic substrate; and the metal oxide is formed as a metal oxide layer disposed directly on an underlying bulk metallic layer of the metallic substrate.

According to another embodiment, a metallic substrate oxidized according to any of the methods disclosed herein is provided. The metallic substrate includes: a bulk metallic layer; and a metal oxide layer disposed directly on the bulk metallic layer, wherein the metal oxide layer is effective for promoting adhesion of the metallic substrate to an object.

According to another embodiment, a method for bonding a metallic substrate to an object includes: providing a metallic substrate comprising a metal oxide layer formed thereon according to any of the methods disclosed herein; and providing an adhesive layer on the metal oxide layer.

According to another embodiment, the method for bonding a metallic substrate to an object further includes mounting the object to the adhesive layer.

According to another embodiment, an article fabricated according to any of the methods disclosed herein is provided. The article includes: a metallic substrate comprising a metal oxide layer formed thereon; and an adhesive layer disposed on the metal oxide layer.

According to another embodiment, the article further includes an object mounted to the adhesive layer.

According to another embodiment, an atmospheric pressure plasma system includes: an electrical power source; and a plasma generating device comprising an electrode coupled to the electrical power source, wherein the electrical power source and the plasma generating device are configured for performing any of the methods disclosed herein.

According to another embodiment, a method for forming an adhesion promoting layer on a metallic substrate includes: generating a non-thermal plasma in air at atmospheric pressure, the non-thermal plasma comprising monatomic nitrogen; and exposing a substrate surface of the metallic substrate to the non-thermal plasma, wherein: the non-thermal plasma nitridizes the metallic substrate to form metal nitride from metal atoms of the metallic substrate; and the metal nitride is formed as a metal nitride layer disposed directly on an underlying bulk metallic layer of the metallic substrate.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
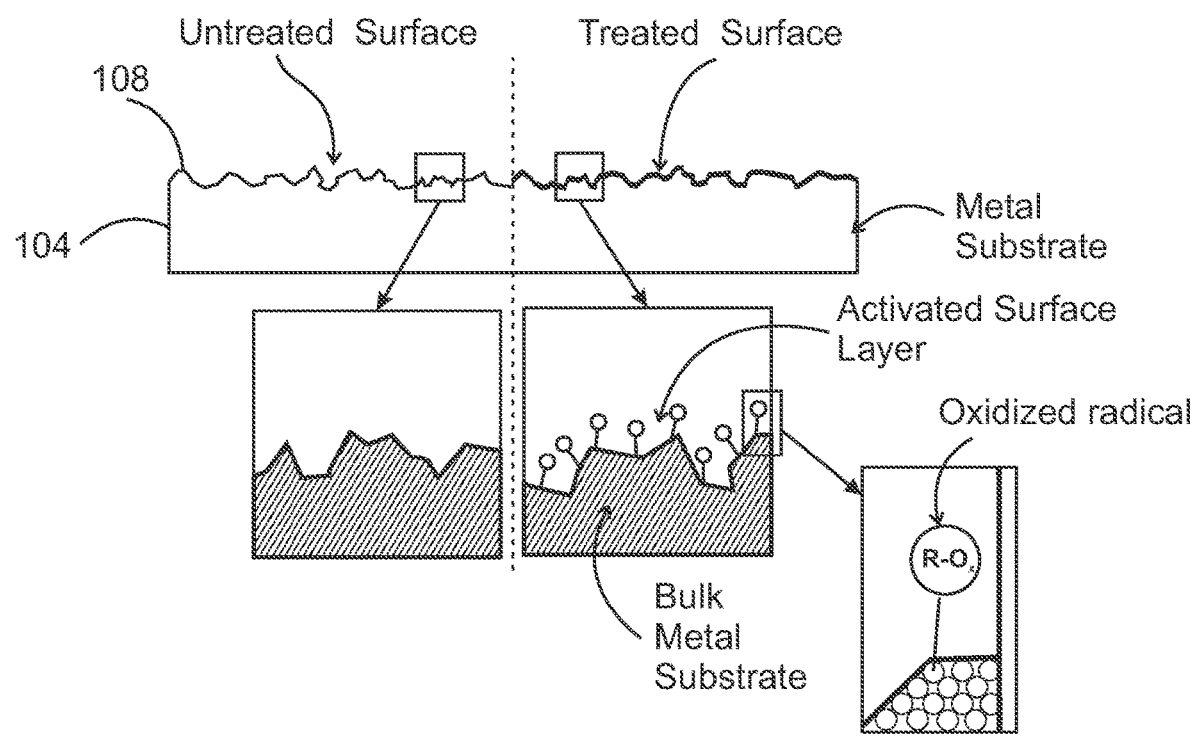
FIG. 1 is a schematic elevation view of a substrate subjected to a conventional plasma-based surface treatment.

As used herein, the term "plasma" generally refers to a (partially) ionized gas-like mass comprising a mixture of charged species (ions and electrons), metastable (electronically excited) species, neutral species, and photons. For convenience, unless specified otherwise or the context dictates otherwise, the term "plasma" encompasses not only fully active (actively generated) plasma but also partially extinguished plasma and afterglow, to the extent that a partially extinguished plasma or an afterglow has properties (composition of species, energy level, etc.) effective for implementing the methods disclosed herein.

As used herein, "non-thermal plasma" (also referred to as "non-equilibrium" plasma, or "cold" plasma) generally refers to a plasma exhibiting low temperature gas-phase ions and neutral species (relative to a "thermal" plasma) and high electron temperatures relative to the temperature of the surrounding gas. A non-thermal plasma is distinguished from a thermal plasma in that a thermal plasma exhibits a higher overall energy density and both high electron temperatures and high ion and neutral temperatures.

As used herein, unless specified otherwise or the context dictates otherwise, the term "generating" in the context of generating plasma refers to the initial step of striking (creating) the plasma from a plasma-precursor gas (or mixture of gases) and also sustaining (maintaining) the plasma after it has been struck. A plasma will be sustained as long as the conditions required for sustaining the plasma are maintained, such as an input of electrical (or electromagnetic) power with the appropriate operating parameters (e.g., voltage, frequency, etc.), a sufficient source of, plasma-precursor gas etc.

As used herein, the term "atmospheric pressure," in the context of "atmospheric pressure plasma," is not limited to a precise value of pressure corresponding exactly to sea-level conditions. For instance, the value of "atmospheric pressure" is not limited to exactly 1 atm. Instead, "atmospheric pressure" generally encompasses ambient pressure at any geographic location and thus may encompass a range of values less than and/or greater than 1 atm as measured at sea level. Generally, an "atmospheric pressure plasma" is one that may be generated in an open or ambient environment, i.e., without needing to reside in a pressure-controlled chamber or evacuated chamber, although a chamber (at or around atmospheric pressure), may be utilized to confine the plasma.

As used herein, the term "substrate" generically refers to any structure that includes a surface on which an adhesion-promoting oxide layer may be formed in accordance with the present disclosure. The substrate may present a surface having a simple planar or curved geometry or may have a complex or multi-featured topography.

As used herein, the term "metallic substrate" refers to a substrate composed of a single metal or a metal alloy. Such a substrate is not necessarily pure, in that a trace amount of impurities may exist in its lattice structure.

As used herein, the term "metal oxide" or "metal nitride," depending on the type of oxide or nitride, generally may refer a stoichiometric or non-stoichiometric formulation of the oxide or nitride. As one non-limiting example, "titanium oxide" may encompass stoichiometric titanium oxide, typically but not exclusively titanium dioxide ($TiO_2$), and/or $TiO_y$, where y ranges from 0.7-2. A mixture of stoichiometric metal oxide (or nitride) and non-stoichiometric metal oxide (or nitride) may be present in a layer of metal oxide (or nitride) formed in accordance with the present disclosure.

As used herein, the term "nanoscale" refers to a dimension (e.g., thickness) on the order of nanometers (nm). A nanoscale dimension is typically one that is less than 1000 nm, i.e., less than 1 micrometer (μm).

According to an aspect of the present disclosure, atmospheric-pressure (AP), non-thermal air plasma is utilized as a modality for promoting (enhancing) the adhesive bonding of a surface of a metallic substrate to another object. The AP plasma is generated in close proximity to the substrate surface to ensure the surface is exposed to the AP plasma or at least the afterglow thereof, depending on the embodiment. In some embodiments, the plasma so generated may be transported toward the substrate surface by a flow of air, or additionally by an electric field, which may be the electric field utilized to generate the plasma. The plasma is generated under conditions that produce a high concentration of monatomic oxygen in the plasma. The plasma may also produce a high concentration of highly energetic and reactive singlet oxygen in the plasma. The plasma so composed is very effective in selectively oxidizing the metallic substrate. Consequently, the plasma forms an oxide layer of nanoscale thickness on the metallic substrate to promote adhesive bonding. The plasma-formed oxide layer is grown from the base metal of the metallic substrate itself, and is therefore permanently, rigidly attached to the substrate. Stated differently, the oxide layer may be characterized as being integral with the underlying bulk of the metallic substrate. The bulk of the metallic substrate may be characterized as that part of the metallic substrate that is substantially free of the metal oxide formed as the overlying oxide layer. Furthermore the plasma-formed oxide layer, in some embodiments, is porous or adds a nanoscale surface texture and may increase the surface area that is available for adhesive bonding. In effect, the outer surface of the oxide layer (i.e., the surface facing away from the bulk of the metallic substrate) replaces the original outer surface of the metallic substrate, as the surface to which an adhesive layer is to be subsequently applied in preparation for adhering an object to the metallic substrate.

A secondary effect of the air plasma is to increase the surface energy of the newly formed plasma-oxidized oxide layer (as compared to the surface energy of the original outer surface of the metallic substrate), which further enhances adhesion when adhesives are applied to the surfaces within a certain period of time. The increased surface energy of the plasma-formed oxide layer may retain an increased surface energy state for many days if the surface is shielded from environmental contamination.

According to another aspect of the present disclosure, atmospheric-pressure (AP), non-thermal air plasma is utilized as a modality for promoting (enhancing) the adhesive bonding of a surface of a metallic substrate to another object, by forming a thick native nitride layer of nanoscale thickness on the metallic substrate to promote adhesive bonding with certain types of adhesives such as, for example, nitrogen-rich polyamide adhesives. In this case, the plasma is generated under conditions favorable for producing high concentrations of monatomic nitrogen and triplet nitrogen.

By way of background, FIG. 1 is a schematic elevation view of a substrate 104 subjected to a conventional plasma-based surface treatment. The substrate 104 is typically a sheet of plastic, textile, or paper. For purposes of comparison, a vertical broken line demarcates a left side and a right side of the substrate 104. On the left side, an outer substrate surface 108 of the substrate 104 is untreated, while on the right side the outer substrate surface 108 has been subjected to a conventional plasma-based surface treatment. In the conventional plasma-based surface treatment, an AP plasma is generated above the outer substrate surface 108, such as by energizing one or more plate electrodes or corona discharge needles, thereby producing oxygen radicals as part of the plasma. As illustrated by the insets on the right side of FIG. 1, some of the oxygen radicals (R—Ox) will attach to the outer substrate surface 108. This plasma-based surface treatment can be effective for increasing the surface energy of the outer substrate surface 108, thereby rendering the outer substrate surface 108 more receptive to bonding with coatings, adhesives and inks (for printing). However, this beneficial effect is temporary, i.e., diminishes over time. That is, after such treatment, if a certain amount of time passes before the substrate 104 is to be adhered to another object (or ink is to be printed on the substrate 104), the substrate 104 must be re-treated with the plasma to re-activate the outer substrate surface 108. Moreover, the conventional plasma-based surface treatment is indeed merely a surface treatment, in the nature of a surface functionalization (or surface modification, or surface activation). The surface treatment does not form a new layer of material onto the outer substrate surface 108 being treated.

Figure 2:
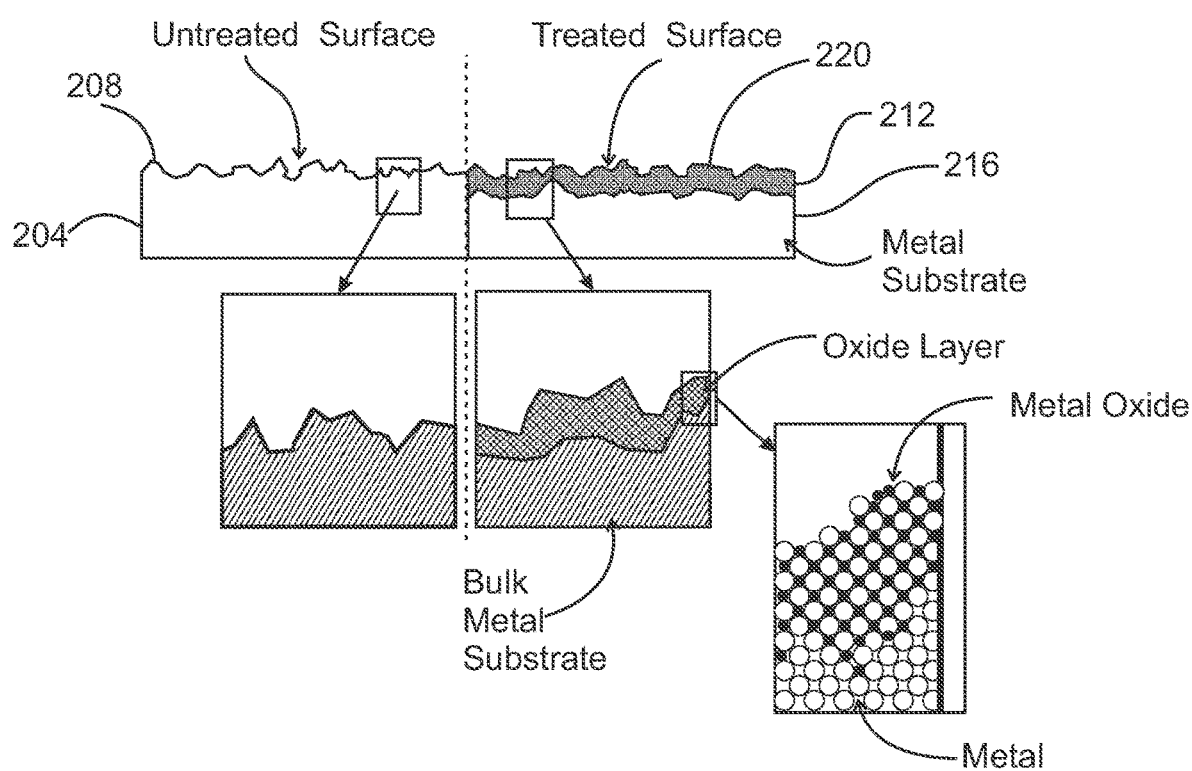
FIG. 2 is a schematic elevation view of a metallic substrate, illustrating an example of a plasma-based method for forming an adhesion promoting layer on the metallic substrate according to an embodiment of the present disclosure.
Figure 3:
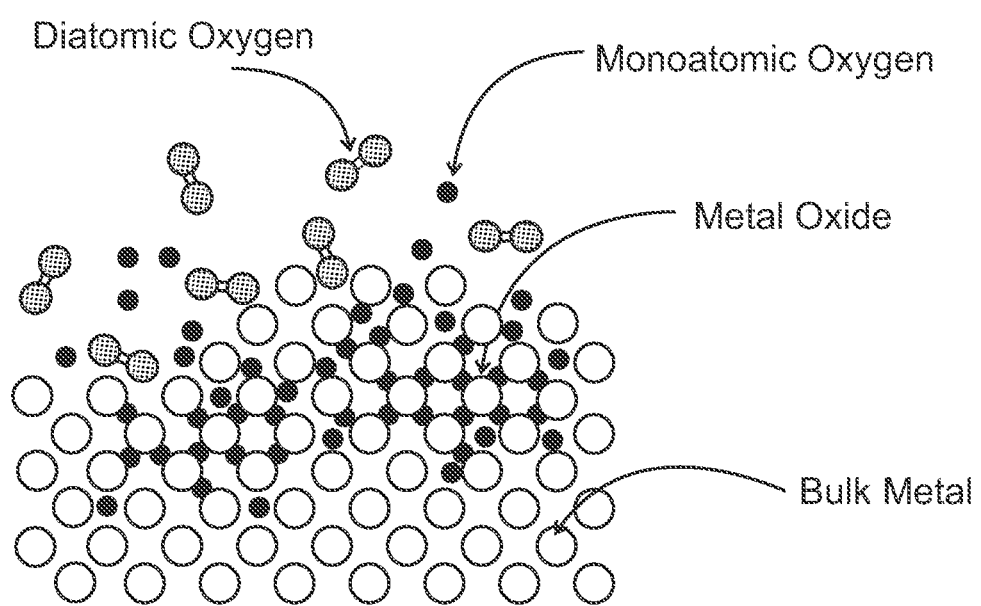
FIG. 3 is a schematic view of a portion of an upper region of the metallic substrate illustrated in FIG. 2, while the metallic substrate is subjected to the method.

FIG. 2 is a schematic elevation view of a metallic substrate 204, illustrating an example of a plasma-based method for forming an adhesion promoting layer on the metallic substrate 204 according to an embodiment of the present disclosure. For purposes of comparison, a vertical broken line demarcates a left side and a right side of the substrate 204. On the left side, an outer substrate surface 208 (an upper surface, from the perspective of FIG. 2) of the metallic substrate 204 is untreated, while on the right side the outer substrate surface 208 has been subjected to the method. The metallic substrate 204 as initially provided has the outer substrate surface 208 on the side of the metallic substrate 204 that is to be bonded to another object. FIG. 3 is a schematic view of a portion of an upper region of the metallic substrate 204 while the metallic substrate 204 is subjected to the method. Generally, the metallic substrate 204 may be composed of any single metal (e.g., titanium, etc.) or a metal alloy (e.g., a stainless steel, a nickel-chromium based alloy, such as from the Inconel family of alloys, such as Inconel 718, etc.). Generally, the object to be bonded to the metallic substrate 204 may be any type of object having any type of composition.

According to the method, a non-thermal plasma is generated in air at atmospheric pressure, and the outer substrate surface 208 is exposed to the non-thermal plasma. The plasma may be generated by generating an electric field in a plasma-forming region (or ionization region) at operating parameters (e.g., direct current (DC) magnitude and power; alternating current (AC) amplitude, frequency, and power; etc.) effective for generating (and sustaining) the plasma in air at atmospheric pressure. In some embodiments, the electrical power applied to the plasma-forming region may be at a radio frequency (RF) or microwave (MW) frequency. The electrical power applied may be pulsed or continuous. The plasma-forming region may be immediately adjacent to (above, from the perspective of FIGS. 2 and 3) the outer substrate surface 208, or may be a short distance away from the outer substrate surface 208 (e.g., in a range from about 1 mm to about 8 mm, one specific yet non-limiting example being about 1.5 mm). In the latter case, the plasma may be flowed toward the outer substrate surface 208 by establishing a flow of air toward the outer substrate surface 208. Air may be flowed toward the outer substrate surface 208 by operating an appropriate gas moving device such as, for example, a fan or a blower. Alternatively or additionally, the electric field generated, the gradient of which is dictated by one or more electrodes, may drive charged species of the plasma toward the outer substrate surface 208.

Generally, the composition of the plasma is a mixture of different components as described earlier in this disclosure, including various charged and electronically excited species of oxygen and nitrogen. According to the method, the plasma is generated under conditions that produce a high plasma density, with a high density of monatomic oxygen ions (and/or other monatomic oxygen species) in the plasma as well as chemically reactive singlet oxygen. In an embodiment, the density of monatomic oxygen ions (or other monatomic oxygen species) in the plasma is in a range from $1 \times 10^{13}$ monatomic oxygen ions/cm$^3$ to $1 \times 10^{18}$ monatomic oxygen ions/cm$^3$, one specific yet non-exclusive example being about $2.55 \times 10^{16}$ monatomic oxygen ions/cm$^3$. As appreciated by persons skilled in the art, singlet oxygen is a highly energetic and chemically reactive form of diatomic oxygen ($O_2$), as compared to the ground-state, or triplet, diatomic oxygen ($O_2$) that is a predominant constituent of naturally occurring air. The monatomic oxygen has a much higher diffusivity and chemical reactivity compared to molecular oxygen species such as diatomic oxygen ($O_2$) and ozone ($O_3$), which may also be produced in the air plasma. As a result of the outer substrate surface 208 being exposed to this plasma, monatomic oxygen species penetrate the outer substrate surface 208 and combine with metal atoms of the metallic substrate 204 to form a metal oxide. Consequently, as illustrated in FIGS. 2 and 3, a distinct metal oxide layer 212 is formed from a portion of the metallic substrate 204, and is rigidly attached to the metallic substrate 204. The metal oxide layer 212 serves as a highly effective adhesion promoting layer to which an adhesive may be subsequently applied.

As illustrated in FIG. 2, after carrying out the method whereby formation of the metal oxide layer 212 is complete, the metallic substrate 204 includes a bulk metallic layer 216, and the metal oxide layer 212 disposed directly on the underlying bulk metallic layer 216. The metal oxide layer 212 includes an outer oxide surface 220, i.e., the surface facing away from the bulk metallic layer 216. The outer oxide surface 220 in effect replaces the original outer substrate surface 208 as the surface to which an adhesive may be applied in preparation for bonding an object to (the newly formed metal oxide layer 212 of) the metallic substrate 204. In an embodiment, the outer oxide surface 220 is porous, or at least is superficially porous. Such nanoscale porosity may significantly increase the surface area of the outer oxide surface 220, thereby providing a significantly increased surface area for adhesive bonding, as compared to a nonporous or less rough surface.

After carrying out the method whereby formation of the metal oxide layer 212 is complete, the metal oxide layer 212 has a thickness defined from the underlying bulk metallic layer 216 (i.e., the interface between the bulk metallic layer 216 and the metal oxide layer 212) to the outer oxide surface 220. The thickness of the metal oxide layer 212 may be on the order of nanometers. As one non-limiting example, the thickness of the metal oxide layer 212 may be in a range from 1 nm to 100 nm. The thickness of the metal oxide layer 212 may be considered to be an average thickness, when taking into account that the interface between the bulk metallic layer 216 and the metal oxide layer 212 does not necessarily occur as an abrupt transition in a single, flat plane, and that the outer oxide surface 220 may be porous.

Generally, the operating parameters associated with generating the plasma are selected to produce a stable plasma discharge. Specifically, the operating parameters are selected to form the metal oxide layer 212 as described herein. The operating parameters may vary depending on the composition of the metallic substrate 204 (i.e., the type of metal or metal alloy) on (from) which the metal oxide layer 212 is to be formed. Examples of operating parameters will now be provided with the understanding that the broad teachings herein are not limited by such examples. The electric field may be generated by applying a voltage between two electrodes in a range from 1 kV to 50 kV. The electric field may be generated by proper arrangement, size and shape of the electrodes so as to have a field strength in a range from 1 kV/cm to 500 kV/cm. The plasma-forming gas (i.e., air, with or without auxiliary gases) may be flowed to the plasma-forming region at an air flow rate in a range from 1 standard liter per minute (SLM) to 5000 SLM. The plasma may be generated so as to have a plasma power density in a range from 0.25 kW/cm$^3$ to 400 kW/cm$^3$. Additionally, in an embodiment, the metallic substrate 204 may be heated during the process of forming the metal oxide layer 212. The metallic substrate 204 may be heated to a temperature in a range from 20° C. to 400° C. The electron density in the plasma may be in a range from $10^{14}$ to $10^{17}$ electrons/cm$^3$. The electron energy in the plasma may be in a range from 1 eV to 10 eV.

From the foregoing, it is evident that the method disclosed herein enhances surface adhesion by forming a metal oxide layer 212 derived from the material of the underlying metallic substrate 204, which is significantly different from conventional plasma-based surface "treatments" such as described above in conjunction with FIG. 1. The method disclosed herein also contrasts with conventional vacuum deposition techniques, such as plasma-enhanced chemical vapor deposition (CVD) and physical vapor deposition (PVD). In such vacuum deposition techniques, the underlying substrate is merely employed as a growth surface upon which new source material(s) (e.g., a precursor gas or solid target, introduced into an evacuated reaction chamber containing the substrate) is deposited to form a layer, i.e., the layer so formed is not derived from the material of the underlying substrate.

Figure 4:
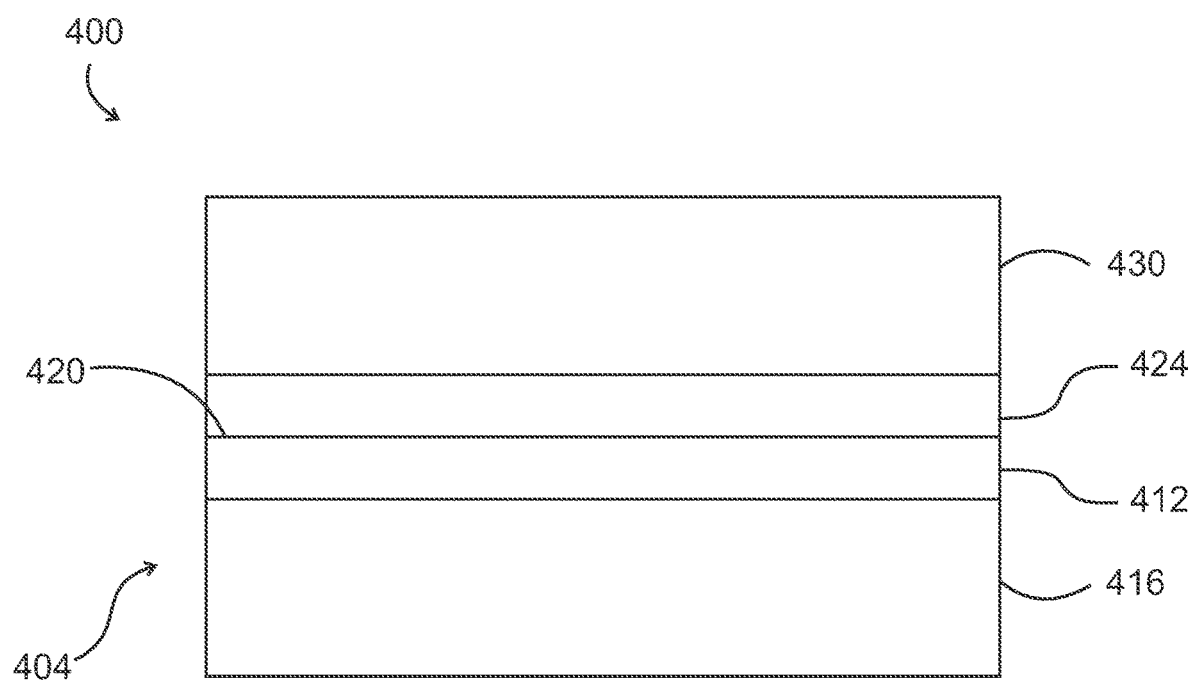
FIG. 4 is a schematic elevation view of an example of an article of manufacture (or product) that may be fabricated according to an embodiment.

FIG. 4 is a schematic elevation view of an example of an article of manufacture (or product) 400 that may be fabricated according to an embodiment. The article 400 includes a metallic substrate 404 and an adhesive layer 424 provided on the metallic substrate 404. The metallic substrate 404 has been prepared to promote adhesion, and accordingly includes a metal oxide layer 412 formed on an underlying bulk metallic layer 416. The adhesive layer 424 is disposed on an outer oxide surface 420 of the metal oxide layer 412. The article 400 may further include an object 430 mounted to the adhesive layer 424. Depending on the embodiment, the adhesive layer 424 may be, or be formed from, a liquid, gel, or solid layer of adhesive material. The adhesive material may have any composition suitable for bonding the type of object 430 provided to the type of metallic substrate 404 provided, such as, for example, various organic polymers (e.g., epoxies), inorganic polymers (e.g., silicone-based or polyphosphazene compounds), etc. The adhesive material may be of the type that requires a curing mechanism such as heat, electromagnetic radiation, pressure, addition of a curative, etc.

Figure 5:
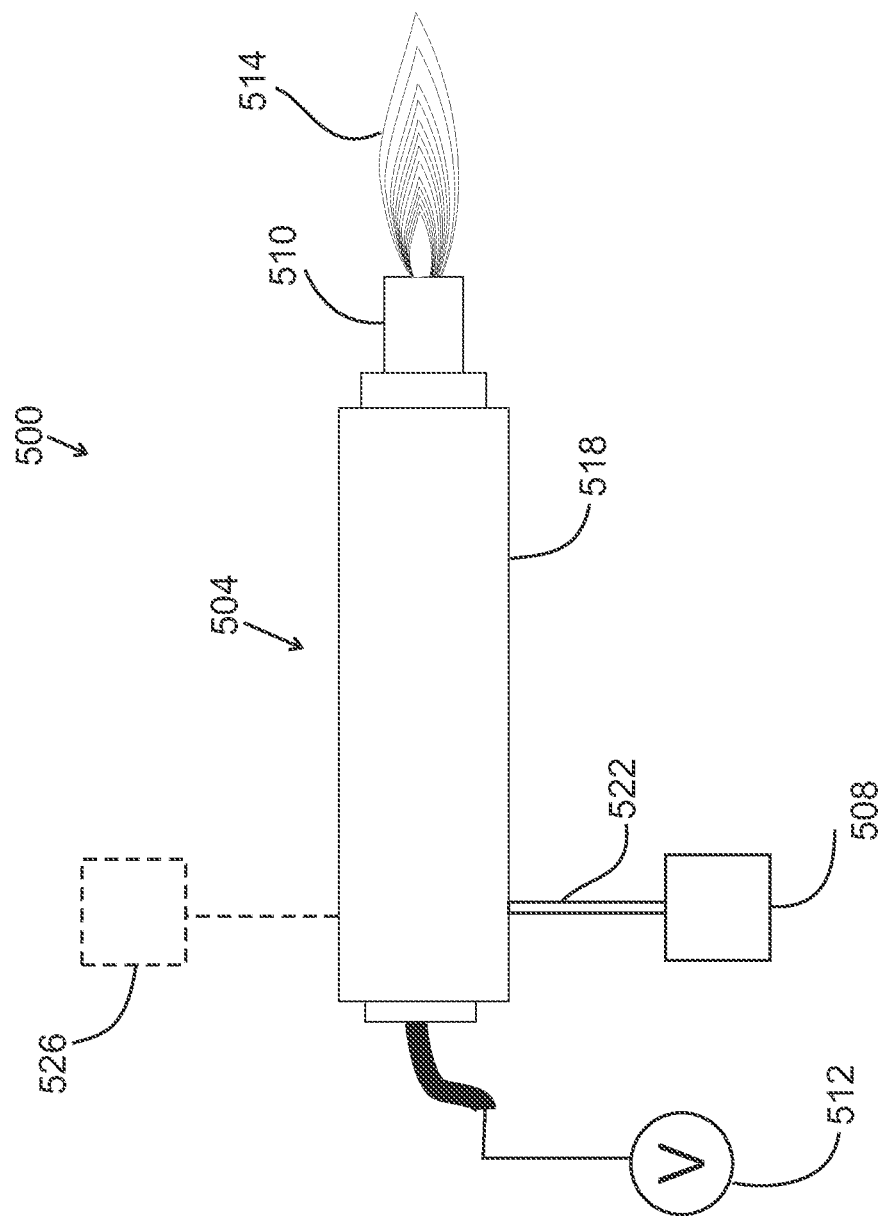
FIG. 5 is a schematic lengthwise view of an example of an AP plasma system according to an embodiment, which may be utilized to generate and apply plasma effective for implementing the methods disclosed herein.

FIG. 5 is a schematic lengthwise view of an example of a plasma system 500 according to an embodiment, which may be utilized to generate and apply plasma effective for implementing the methods disclosed herein. The plasma system 500 generally includes a plasma generating device 504 (or applicator, apparatus, instrument, pen, gun, etc.) configured to produce a non-thermal AP plasma, a plasma-generating gas supply source 508, and a power source 512.

The plasma generating device 504 generally includes a main body 518 (or support structure, housing, etc.) which may be configured for manual use (i.e., handheld) or automated use (e.g., attached to a multi-axis robotics system, not shown). For manual operation, a portion of the main body 518 may be utilized as a handle. The main body 518 may be, or may be surrounded by, an electrically-insulating and/or thermally-insulating structure, as needed. The plasma device 504 further includes a plasma outlet 510 at its distal end from which a plume or jet 514 of non-thermal AP plasma is emitted. In the illustrated embodiment, the plasma outlet 510 is or includes a nozzle. The nozzle may be configured to cause rapid expansion of the gas emanating therefrom. The nozzle may have a converging or converging-diverging configuration of appropriate dimensions.

The plasma-generating gas supply source 508 is in fluid communication with a gas inlet 522 of the plasma generating device 504 by any suitable conduit and fittings for supplying a suitable plasma-generating gas to the plasma generating device 504. In one example, the plasma-generating gas is air, in which case the plasma-generating gas supply source 508 may be a source of low-pressure compressed air. Alternatively, the plasma-generating gas supply source 508 may be a gas moving device such as a fan or a blower configured to draw ambient air into the main body 518, which may be positioned upstream or downstream (not shown) from the gas inlet 522, and may be positioned in the main body 518 (not shown). In the case of an air plasma, the plasma-generating gas supply source 508 may serve as the sole source of active species of the plasma (e.g., oxygen-based and nitrogen-based species). Alternatively, the plasma system 500 may include one or more auxiliary plasma-forming gas supply sources 526 communicating with the with the main body 518 for such purposes as enhancing the supply of $O_2$ or $N_2$ or for supplying other types of species as described above.

The power source 512 is in electrical communication with the plasma generating device 504 by any suitable wiring and connectors for supplying electrical power according to operating parameters suitable for generating and maintaining the type of plasma described herein. In particular, the power source 512 may communicate with at least one electrode positioned in the main body 518. In FIG. 5, the power source 512 represents the electronics and user controls needed for this purpose. As appreciated by persons skilled in the art, the user controls may be configured as necessary to enable the setting and adjustment of various operating parameters of the voltage or current signal fed to the plasma generating device 504 such as, for example, power level, drive voltage amplitude, drive frequency, waveform shape, etc. Electrical signals of AC (e.g., RF, MW), DC, pulsed DC, or arbitrary periodic waveforms with or without an applied DC offset may be utilized to drive the plasma as appropriate for a particular application. For simplicity, internal components of the main body 518 of the plasma generating device 504 utilized for receiving the electrical and gas inputs and generating the plasma therefrom (e.g., electrodes, gas conduits, etc.) are omitted in FIG. 5 but readily understood by persons skilled in the art.

In an embodiment, the plasma generating device 504 may be moved (scanned) over the outer substrate surface according to a desired path of movement (e.g., row by row, serpentine, spiral, orbital, etc.). The movement may be effected by manual or automated means and at a desired scan speed (e.g., meters per second, or m/s), as needed to form the metal oxide layer on the underlying metallic substrate. As one non-limiting example, the scan speed may be in a range from 0.125 m/s to 5 m/s, and in some embodiments with 50% to 95% overlap between successive passes in a back and forth motion across the surface. The movement may be performed in iterations, between dwell periods during which the plasma generating device 504 is held stationary over a particular region of the outer substrate surface. The plasma generating device 504 may be moved relative to the metallic substrate, and/or the metallic substrate may be moved relative to the plasma generating device 504.

Figure 6:
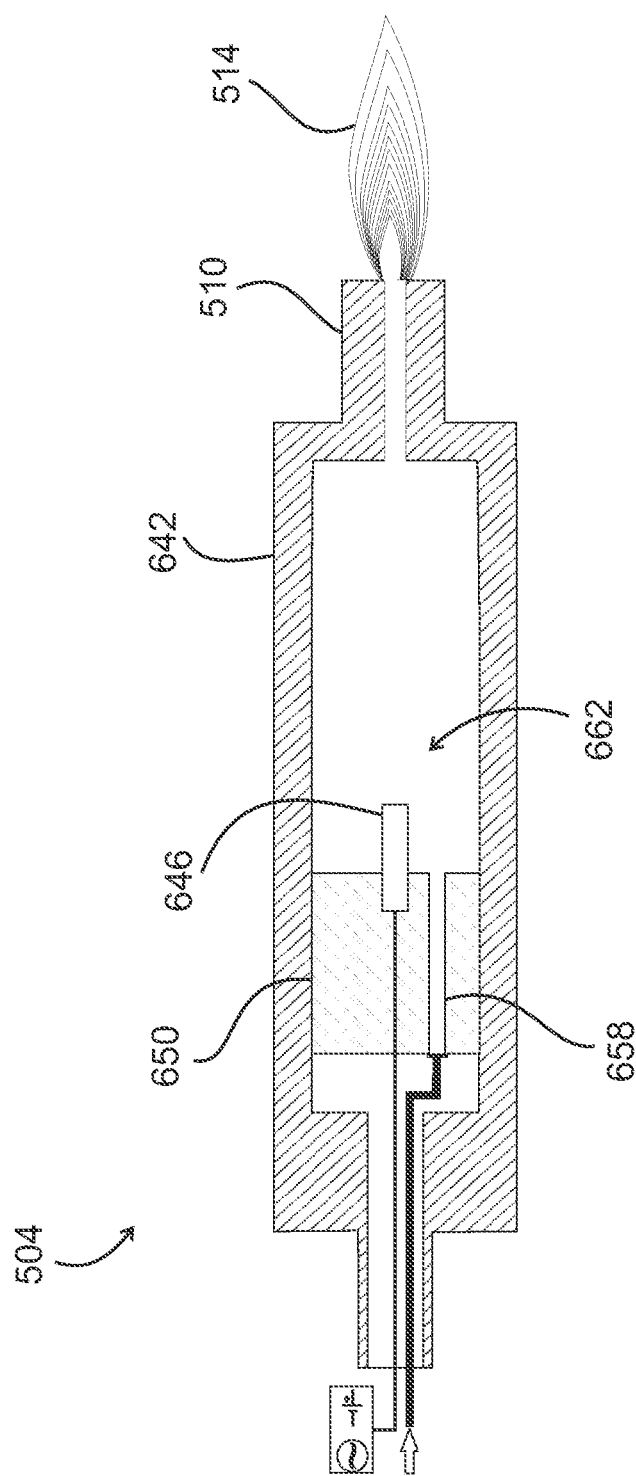
FIG. 6 is a schematic lengthwise cross-sectional view of the AP plasma generating device illustrated in FIG. 5.

FIG. 6 is a schematic lengthwise cross-sectional view of the plasma generating device 504. The plasma generating device 504 includes an axially elongated plasma-generating chamber 642 enclosed by the main body 518 (FIG. 5). At least one "hot" or powered electrode 646 is positioned in the plasma-generating chamber 642. The plasma-generating chamber 642 may define a confined plasma-forming region 662 therein, proximate to the powered electrode 646. The plasma-generating chamber 642 may serve as a ground electrode or counter-electrode to the powered electrode 646 for generating plasma in the plasma-forming region 662. Alternatively, additional electrodes, to which electrical potentials may be applied or which may be held at ground or electrically floating states, may be included as needed for generating an electrical field having a desired size, field strength, spatial orientation in the plasma-forming region 662. The plasma-generating chamber 642 may also serve as a conduit for flowing gases and plasma. Electrical connections to the powered electrode 646 may be made through an electrically insulating (e.g., dielectric) structure 650 located at the proximal end of or in the plasma-generating chamber 642. One or more gas passages 658 may be formed through the dielectric structure 650 in fluid communication with the plasma-generating chamber 642. The gas passages 658 may be placed in fluid communication with the gas inlet 522 (FIG. 5). Accordingly, the gas inlets 658 provide a flow path for plasma-generating gas (particularly air) fed to the plasma-forming region 662 proximate to the powered electrode 646. In operation, the plasma is generated in the plasma-forming region 662 and subsequently flows with the gas flow toward the plasma outlet 510 positioned at a distal end of the plasma-generating chamber 642.

In an embodiment, the gas passages 658 (or exit openings thereof) may be oriented at some angle to the central, longitudinal axis of the plasma-generating chamber 642, whereby gas is introduced into the plasma-generating chamber 642 with a significant tangential vector and consequently flows in the axial direction in a vortex flow pattern or path.

In an embodiment, the plasma outlet 510 may be widened in the transverse direction orthogonal to the longitudinal axis of the plasma-generating chamber 642 (i.e, along the axis orthogonally passing through the drawing sheet). The wide plasma outlet 510 may be realized by one or more wide exit slots, a linear of array of round exit openings, or a combination of both of the foregoing. Multiple exit slots or round openings may communicate with a single plasma-generating chamber 642 and associated electrode(s) (e.g., powered electrode 646) or by multiple plasma-generating units respective defined multiple groups of plasma-generating chambers and associated electrode(s). By such configurations, the plasma generating device 504 may produce a wide, predominantly linear or horizontally-oriented plasma plume or "plasma line" that extends the width of the plasma plume.

Figure 7:
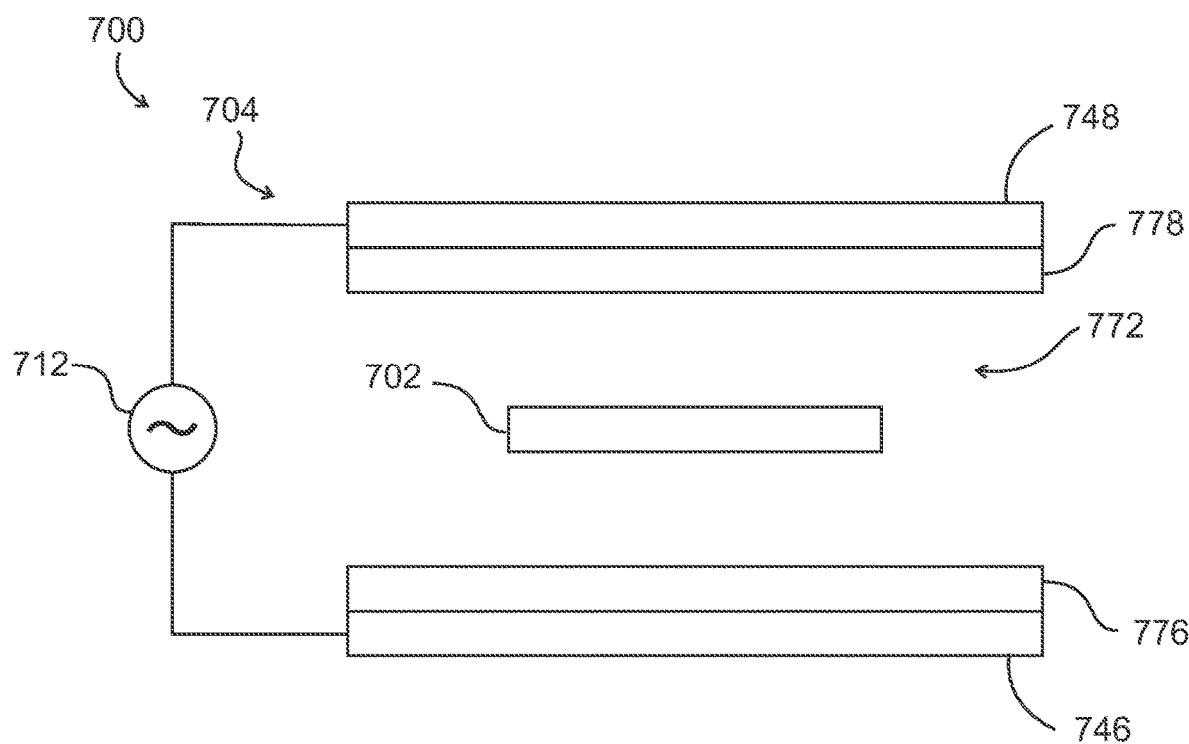
FIG. 7 is a schematic lengthwise view of an example of an AP plasma system according to another embodiment, which may be utilized to generate and apply plasma effective for implementing the methods disclosed herein.

FIG. 7 is a schematic lengthwise view of an example of a plasma system 700 according to another embodiment, which may be utilized to generate and apply plasma effective for implementing the methods disclosed herein. The plasma system 700 generally includes a plasma generating device 704, a plasma-generating gas supply source (not shown), and a power source 712. The plasma generating device 704 includes two planar (plate-shaped) electrodes, namely a first electrode 746 and a second electrode 748. The second electrode 748 is parallel to the first electrode 746, and is spaced from the first electrode 746 by an open gap 772. The size of the gap 772 (i.e., the distance between the first electrode 746 and the second electrode 748) may be on the order of centimeters (cm). One or both of the electrodes 746 and 748, or at least the side of the electrode(s) 746 and 748 facing the gap 772, is covered by a dielectric barrier 776 and/or 778, i.e., a layer of dielectric material, such that at least one layer of dielectric material is interposed between the electrodes 746 and 748. Accordingly, in this embodiment the plasma generating device 704 is configured to produce a dielectric barrier discharge (DBD) plasma. In this embodiment, the plasma-generating gas supply source may be a chamber in which the electrodes 746 and 748 are located, or may include one or more components configured for establishing a flow of air (and optionally auxiliary gases) into the gap 772 where the plasma is generated. In some embodiments, a portion of the structure defining such a chamber may serve as one of the electrodes 746 and 748. In operation, a metallic substrate 702 on which a metal oxide layer is to be formed is positioned in the gap 772 between the electrodes 746 and 748, and a non-thermal AP plasma having the attributes disclosed herein is generated between the electrodes 746 and 748.

According to other embodiments, and as noted above, the methods disclosed herein may be implemented to form a nitride layer instead of an oxide layer, which serves as an adhesion promoting layer suitable for the use of certain types of adhesives. In such embodiments, a non-thermal plasma is generated in air at atmospheric pressure that includes a significant amount of monatomic nitrogen ions (or other monatomic nitrogen species). The substrate surface of the metallic substrate is exposed to the non-thermal plasma, whereby the non-thermal plasma nitridizes the metallic substrate to form metal nitride from metal atoms of the metallic substrate. The metal nitride is formed as a metal nitride layer disposed directly on an underlying bulk metallic layer of the metallic substrate.

In general, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A method for forming an adhesion promoting layer on a bulk metallic substrate comprising throughout, except for trace impurities, only a single metal or a single metal alloy, the method comprising:
   generating a non-thermal plasma in air at atmospheric pressure in a confined plasma-forming region, the non-thermal plasma comprising monatomic oxygen; and
   downstream from the confined plasma-forming region, exposing metal atoms of a substrate surface of the bulk metallic substrate to the monatomic oxygen in a plasma plume of the non-thermal plasma emitted from a nozzle in fluid communication with the confined plasma-forming region of the non-thermal plasma, wherein:
   the non-thermal plasma oxidizes the bulk metallic substrate to form, for the adhesion promoting layer, a metal oxide from the metal atoms of the bulk metallic substrate; and
   the adhesion promoting layer comprising the metal oxide is formed as a metal oxide layer disposed directly on the bulk metallic substrate and grown from the metal atoms of the single metal or the single metal alloy of the bulk metallic substrate.

2. The method of claim 1, wherein generating the non-thermal plasma comprises generating an electric field in the presence of air.

3. The method of claim 2, wherein generating the electric field comprises applying a voltage between two electrodes in a range from 1 kV to 50 kV.

4. The method of claim 3, wherein the electric field has a field strength in a range from 1 kV/cm to 500 kV/cm.

5. The method of claim 1, further comprising flowing air to the confined plasma-forming region.

6. The method of claim 5, comprising flowing air at an air flow rate in a range from 1 SLM to 5000 SLM.

7. The method of claim 1, wherein the non-thermal plasma has an applied power density in a range from 0.25 $kW/cm^3$ to 400 $kW/cm^3$.

8. The method of claim 1, comprising, before or during exposing the substrate surface to the non-thermal plasma, heating the metallic substrate.

9. The method of claim 8, comprising heating the metallic substrate to a temperature in a range from 0° C. to 400° C.

10. The method of claim 1, comprising:
    before or during generating the non-thermal plasma, flowing diatomic oxygen gas into the confined plasma-forming region to increase a concentration of diatomic oxygen in the confined plasma-forming region.

11. The method of claim 1, comprising:
    before or during generating the non-thermal plasma, flowing an auxiliary gas into the confined plasma-forming region.

12. The method of claim 11, wherein the auxiliary gas is selected from the group consisting of: diatomic nitrogen, diatomic fluorine, diatomic chlorine, diatomic bromine, diatomic iodine, a nitrogen compound, a fluorine compound, a chlorine compound, a bromine compound, an iodine compound, a boron compound, a carbon compound, an oxygen compound, a sulfur compound, a phosphorous compound, a silicon compound, a selenium compound, a tellurium compound, and a combination of two or more of the foregoing.

13. The method of claim 1, wherein:
    the confined plasma-forming region comprises a chamber; and
    exposing the substrate surface to the non-thermal plasma comprises flowing the non-thermal plasma from the chamber, through an outlet, and toward the substrate surface.

14. The method of claim 1, wherein the metal oxide layer comprises an outer oxide surface and has a thickness defined from the underlying bulk metallic layer to the outer oxide surface, and the thickness is on the order of nanometers.

15. The method of claim 1, wherein the metal oxide layer comprises an outer surface having a surface energy higher than a surface energy of the substrate surface prior to the substrate surface being exposed to the non-thermal plasma.

16. A method for forming an adhesion promoting layer on a metallic material the method comprising:
    generating a non-thermal plasma in air at atmospheric pressure in a confined plasma-forming region, the non-thermal plasma comprising monatomic oxygen; and
    downstream from the confined plasma-forming region, exposing metal atoms of metallic material to the monatomic oxygen in a plasma plume of the non-thermal plasma emitted from a nozzle in fluid communication with the confined plasma-forming region of the non-thermal plasma, wherein:

the non-thermal plasma oxidizes the metallic material to form, for the adhesion promoting layer, a metal oxide from the metal atoms of the metallic material; and the adhesion promoting layer comprising the metal oxide is formed as a metal oxide layer disposed directly on the metallic material and grown from the metal atoms of the metallic material.

\* \* \* \* \*